May 15, 1928.　　　　　　　　　　　　　　　1,669,941
R. M. KENNEDY
POWER SAW
Filed March 18, 1927

Witnesses
Joseph Huber
Samuel P. Steen

Inventor
Ralph M. Kennedy
by Fred H. Seeberger
His Attorney

Patented May 15, 1928.

1,669,941

UNITED STATES PATENT OFFICE.

RALPH M. KENNEDY, OF PHILADELPHIA, PENNSYLVANIA.

POWER SAW.

Application filed March 18, 1927. Serial No. 176,498.

This invention relates to power saws, and more particularly to the type having saw tables that may be longitudinally and transversely adjustable.

The object of my invention is to provide a particularly simple hinging means for attaching saw tables to the saw frame so that they may be expeditiously and effectively adjusted to any desired position. By means of this improvement the saw table may be adjusted at any angle to the side of the saw blade, and simultaneously elevated at one end to regulate the cutting depth of the saw, and have the capacity of retaining perfect alignment of the saw slot in the work table with the saw blade irrespective of the transverse or longitudinal adjustment of the saw table.

Saw tables that are hinged direct to a quadrant member are limited in their transverse adjustment when it is necessary to longitudinally elevate the table to regulate the cutting depth of the saw, by reason of the fact, that, where such elevation is desired, the saw slot does not remain in alignment with the saw blade and must be adjusted to restore proper alignment. My present invention obviates the necessity for such adjustment, thereby simplifying the operation of the machine, and increasing its utility.

Figure 1:
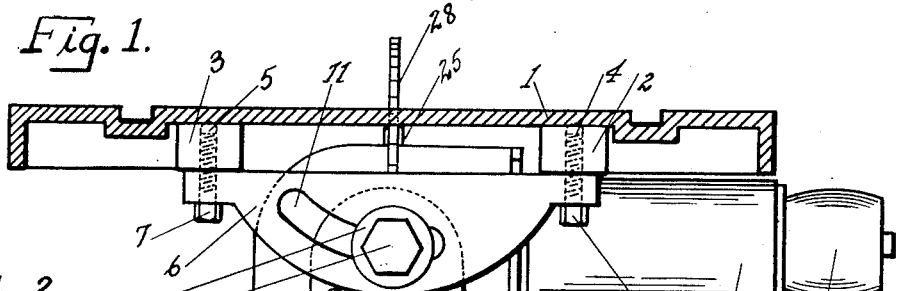
Figure 2:
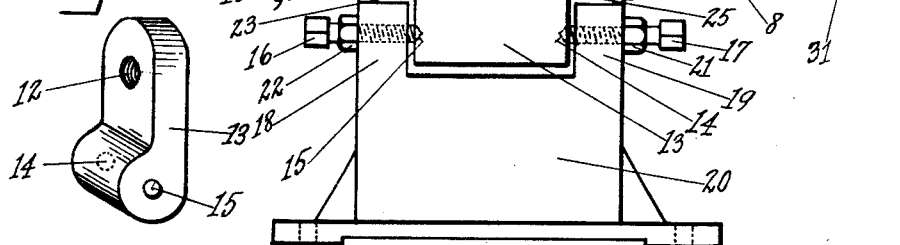
Figure 3:
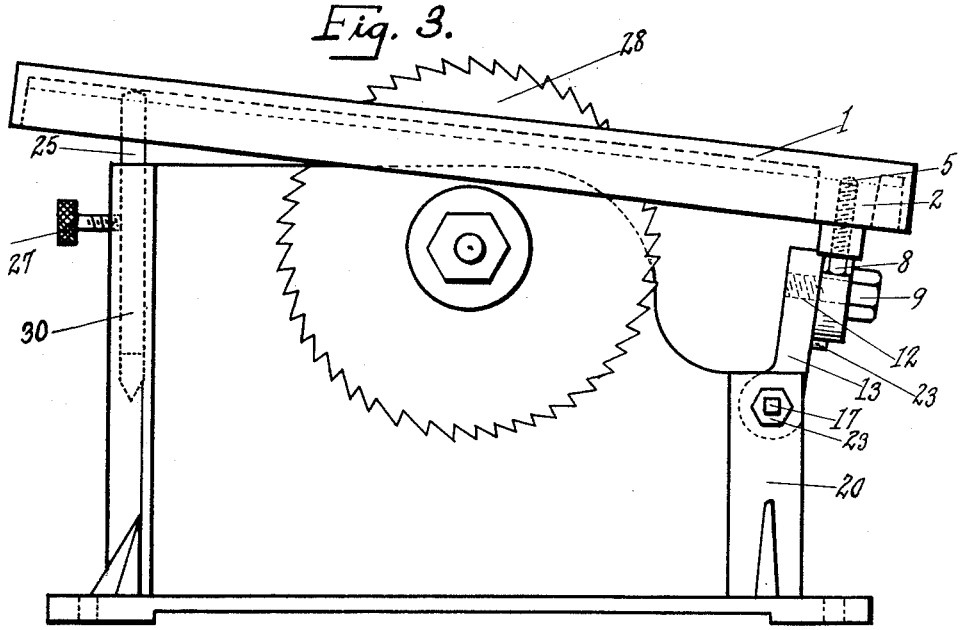

The improvement claimed is hereinafter fully set forth:

Figure 1. is a rear view, partly in elevation, and partly in section, of a power saw, and table mounting means; Fig. 2. a view in perspective, of the hinge block; and Fig. 3. a side elevation of a power saw showing the table longitudinally elevated.

In the practice of my invention, referring descriptively to the specific embodiment thereof which is herein exemplified, bosses, 2, and 3, having threaded openings, 4, and 5, therein, are disposed on the under side of a work table, 1, at its rear end. A quadrant member, 6, is rigidly secured to the work table, by means of cap screws, 7, and 8, passing through said member into the bosses, 2, and 3. A cap screw, 9, passes through a washer, 10, and through the arcuate slot, 11, in the quadrant member, and engages a threaded opening, 12, in the hinge block, 13, thereby permitting the quadrant to be adjusted to any position within the limits of the arcuate slot therein. The pins, 23, and 24, provide a seat or saddle for the quadrant member, whereby the saw slot in the work table is kept in alignment with the saw blade, 28, irrespective of the angle of table inclination to the side of the saw.

A hinge block, 13, secured to the table, is provided with spotted openings, 14, and 15, for the purpose of receiving the cone points of set screws, 16, and 17, which pass through the threaded openings in upwardly extending lugs, 18, and 19, at the rear end of the base, 20, and are locked in position by lock nuts, 21, and 22, thereby providing pintles for the hinge block. It will be observed that the hinge block may be adjusted laterally, in order to align the saw slot in the work table, 1, with the saw blade, 28, which, after the initial setting, requires no further adjustment. By means of the hinge block, 13, the table may be longitudinally elevated at the front end to any useful height without destroying the perfect alignment of the saw slot in the work table irrespective of the transverse or lateral adjustment of said work table to the side of the saw blade.

A rod, 25, which is vertically disposed in the opening, 30, in the front end of the base, 20, provides the supporting means for the work table, when elevated or in normal position, and is secured in the desired elevation by a knurled screw, 27. A rotatable saw spindle is mounted in a housing, 31, in the base, 20, below the work table, and has a pulley, 32, at its outboard end. The opposite end of the spindle has the usual flanges and nut to secure the saw blade in fixed relation with the rotatable spindle.

I claim as my invention and desire to secure by Letters Patent:

1. A power sawing machine, comprising a supporting frame; a work table; a rotatable spindle mounted in the supporting frame below the work table; a quadrant member attached to the work table; a hinge block secured in adjustable relation to the quadrant member, and pivotally supported in one end of the frame; and means in the frame for supporting the free end of the work table.

2. A power sawing machine, comprising a supporting frame; a work table and a quadrant member secured thereto; a hinge block, co-operating with the quadrant member, and adapted to function as a hinge connection between said member and the supporting frame, to permit the work table to be simultaneously inclined in a transverse and longitudinal relation to the vertical plane of the saw blade; means, carried by the hinge block, to secure the table in its transverse position; means, carried by the frame, to support the table in its longitudinal elevation; and a saw spindle, rotatably mounted in the frame, below the work table.

3. In a power sawing machine, having a rotatable saw spindle, mounted in the saw frame below the table, the combination of a work table; and a quadrant member, co-operating with a hinge block, pivotally mounted in a supporting frame, to permit simultaneous transverse and longitudinal adjustment of the work table, in angular and vertical relation to the saw blade.

4. As a new article of manufacture, a power sawing machine, having a hinge block, co-operating with a quadrant member, secured to the work table, said block being pivotally supported in the saw frame, and having the characteristic of maintaining the saw slot in the work table in alignment with the saw blade, irrespective of the degree of transverse or longitudinal adjustment of the saw table.

5. As a new article of manufacture, a power sawing machine, having a supporting frame, and a work table, with a quadrant member secured thereto, a supporting means, carried by the frame, to support the table at one end thereof, the quadrant member co-operating with a block, adapted to function as a hinge connection between the quadrant member and the supporting frame, to permit simultaneous transverse and longitudinal adjustment of the saw table.

RALPH M. KENNEDY.